United States Patent [19]

Quinn

[11] 4,452,278
[45] Jun. 5, 1984

[54] SPECTACLE LINE BLIND WITH VENT

[75] Inventor: Joseph Quinn, Kearny, N.J.

[73] Assignee: Fetterolf Corporation, Skippack, Pa.

[21] Appl. No.: 430,423

[22] Filed: Sep. 30, 1982

[51] Int. Cl.³ .............................................. F16L 55/10
[52] U.S. Cl. ...................................... 138/94.3; 138/44
[58] Field of Search ...................... 138/40, 44, 45, 46, 138/89, 94.3, 94.5; 251/193, 326

[56] References Cited

U.S. PATENT DOCUMENTS

| | | | |
|---|---|---|---|
| 2,309,304 | 1/1943 | Creighton | 138/94.3 |
| 2,419,069 | 4/1947 | Griffin | 138/94.3 |
| 2,462,731 | 2/1949 | Duggan | 138/94.3 X |
| 2,709,455 | 5/1955 | Greenwood | 138/94.3 |
| 2,726,683 | 12/1955 | Seinbach | 138/94.3 |
| 4,343,332 | 8/1982 | Williams et al. | 138/94.3 |

FOREIGN PATENT DOCUMENTS 1274549  5/1972  United Kingdom .............. 138/94.3

Primary Examiner—James E. Bryant, III
Attorney, Agent, or Firm—Blum, Kaplan, Friedman, Silberman & Beran

[57] ABSTRACT

A spectacle line blind includes a pivotable or rotatable spectacle plate having at one end a conventional full opening providing little obstruction to flow of liquid or gas. On the other end of the spectacle valve plate a blank disc seals one of said inlet and outlet ducts. The opposite side of this blank disc includes spacers having axial and radial openings therebetween which permit gases to vent to the atmosphere from the other duct.

5 Claims, 4 Drawing Figures

SPECTACLE LINE BLIND WITH VENT

BACKGROUND OF THE INVENTION

This invention relates generally to a spectacle line blind of the type used in pipelines to provide either full flow or no-flow operation between a source and a tank without modulated flow control, and more particularly, to a line blind which blocks entry of flow through the valve from the source to the tank while at the same time permitting venting of the tank. In the prior art, spectacle valves have been used on large pipe lines and ships to provide two conditions of operation. When the spectacle valve plate is in one position a straight-through unobstructed path is provided for gas flow through the valve. When the spectacle plate is rotated 180° a solid panel is placed between the inlet and outlet of the valve entirely blocking the flow through the valve. Such a valve, when shut off and having proper seals, isolates the tank from the source effectively and simply and provides low flow resistance when opened. However, venting of the tank is not possible through the valve as constructed and other means must be used. For example, in the prior art vent valves have been designed for use in the supply line itself. The valve has an external cover which is removed when it is desired to provide venting. A wedge-shaped venting gate is then inserted in the valve and a cover is placed over the opening through which the venting gate is inserted. The venting gate includes ports which provide access to the tank, and the valve cover has vent holes such that vapor is vented from the tank. Another venting method using, for example, a plug in the supply pipe during venting is considered unsafe when venting cargo tanks because the plug may inadvertently be left in place when all other tank openings are closed causing overpressurization of the tank during loading. The wedge valve described above of the prior art requires the physical removal and insertion of the wedge-shaped venting gate and this consumes time and labor and complicates the venting procedure.

What is needed is a simple line blind which also permits venting.

SUMMARY OF THE INVENTION

Generally speaking, in accordance with the invention, a spectacle line blind especially adapted to provide venting of one side of the valve is provided. The valve includes a pivotable or rotatable spectacle plate having at one end a conventional full opening such that when positioned in the line of flow from valve inlet to valve outlet provides little, if any, obstruction to flow of liquid or gas. On the other end of the spectacle valve plate is positioned a blank disc which, when in alignment between the valve inlet and outlet, seals one of said inlet and outlet ducts. The other side of this blank disc includes spacers having axial and radial openings therebetween which permit gases to vent to the atmosphere from the other duct.

Accordingly, it is an object of this invention to provide an improved spectacle line blind which effectively blocks one entrance to the valve while permitting venting through the other entrance to the valve.

Another object of this invention is to provide an improved spectacle line blind with vent which operates in two modes without the addition or removal of components.

A further object of this invention is to provide an improved spectacle line blind with vent which is readily changed from the open to the closed/vented condition.

Still other objects and advantages of this invention will in part be obvious and will in part be apparent from the specification.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DESCRIPTION OF THE PREFERRED EMBODIMENTS

Figure 1:
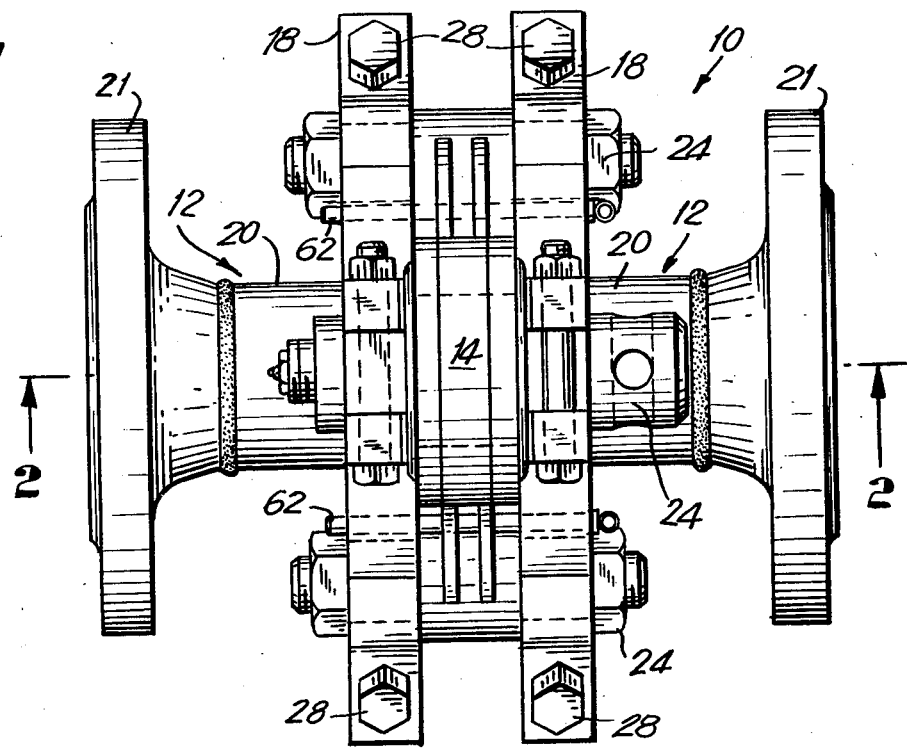
FIG. 1 is a top view of a spectacle line blind with vent in accordance with the invention.

With reference to the drawings, a spectacle line blind 10 having a venting capability in accordance with this invention includes a pair of end or body flanges 12, a spectacle plate 14, and O-ring seals 16 on the spectacle plate 14. The O-ring seals 16 are commercial items and accordingly, receive no detailed description here.

The end flanges 12 are formed of a generally triangular flange plate 18 integrally connected to a pipe stub 20 extending transversely from the flange plate 18 and circular flanges 21 connected integrally to the other ends of the pipe stubs 20. The two body flanges 18 are in opposed positions with flange plates facing and with the pipe stubs 20 and flanges 21 coaxially aligned. A central opening 22 in the body flanges 12 allows for straight-through flow as described hereinafter.

The body flanges 12 are held together by three spreader nut and bolt assemblies 24 which pass through cusps in the faces of the flange plates 18. Each spreader nut and bolt assembly 24 is held in position by a retaining nut 26 and bolt 28.

The spectacle plate 14 fits between the flange plates 18 of the body flanges 12. The spectacle plate includes two circular discs 30, 32 joined together by a web 34 having an oval opening 36 substantially centered between the discs 30, 32. The circular centers of the discs 30, 32 lie on a common line passing through the longitudinal axis of the oval opening 36. Thus, there is substantial symmetry in the spectacle plate 14. Triangular tabs 38 extend from the web 34 transversely to the common central axis 35. The spectacle plate 14 is mounted for rotation about an axis 42.

The circular disc 32 has a flow opening 44 passing therethrough such that when the circular disc 32 is in the lower position (not shown) by pivoting the spectacle plate 14 about the axis of rotation 42 in the known manner for operation of spectacle valves, the circular opening 44 aligns with the openings 22 in the pipe stubs 20 and straight-through flow is possible. O-rings 16 are located on the faces of the circular disc 32 and when the body flanges 12 are drawn together by operation of the spreader nut and bolt assemblies 24, the O-rings 16 provide a seal between both side surfaces of the circular disc 32 and the adjacent flange plates 18. The flange plates 18 are provided with stainless steel annular rings 46 which provide a smooth sealing surface with the O-rings 16.

Figure 2:
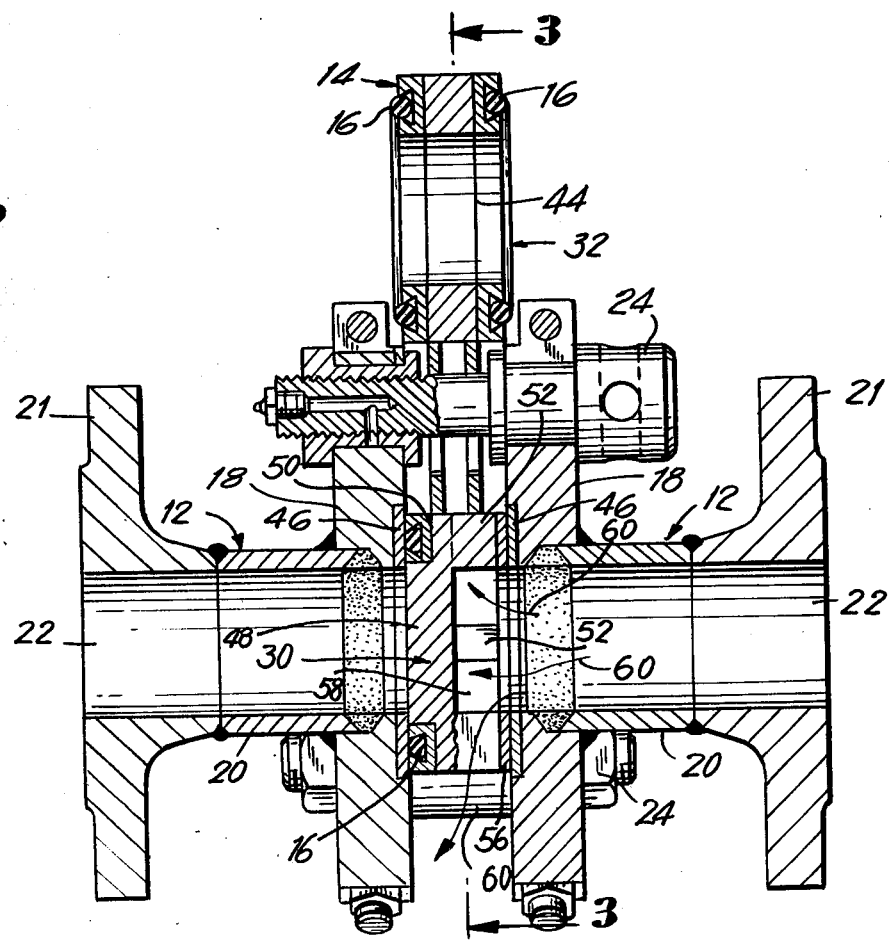
FIG. 2 is a sectional view of the blind with vent taken along the line 2—2 of FIG. 1.

The circular disc 30 of the spectacle plate 14 includes a solid disc 48 having a peripheral shoulder 50 for containing a mounted O-ring 16 in position to mate with the stainless steel ring 46 which is an integral part of the adjacent flange plate 18 (FIG. 2). Thus, when the disc 30 is in the lower position (FIG. 2), an O-ring seal is made between the disc 30 and the body flange 12 on the left side of the spectacle blind 10 (FIG. 2) in accordance with the invention.

Four posts 52 extend from the inner surface 54 of the solid disc 48 and support an annular ring 56 such that, as illustrated in FIG. 2, when the disc 30 is in the lower position, the annular ring 56 abuts the stainless steel annular ring 46 on the adjacent flange plate 18. Thus, when the flange plate 30 is in the lower position (FIG. 2), the central opening 58 in the annular ring 56 aligns with the central opening 22 in the body flange 12 including the flange 21, pipe stub 20 and flange plate 18.

Figure 4:
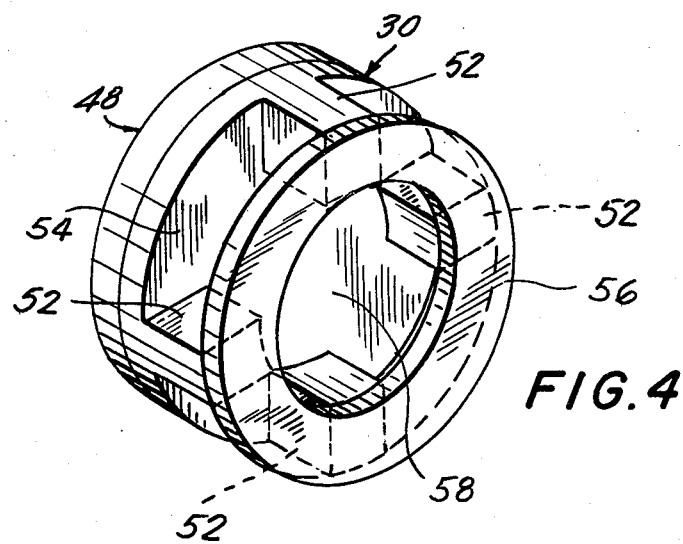
FIG. 4 is a portion of a spectacle valve plate illustrating a line blind with vent in accordance with the invention.

Accordingly, while the left side flow path is blocked by the solid disc 48 and sealed by the O-rings 16, the right side flow enters axially through the opening 58 in the ring 56 of the disc 30 and leaves radially through the spaces between the posts 52, escaping to the ambient environment. It should be noted in FIG. 4 that the disc 30 is shown detached from the web 34 of the spectacle plate 14 for the sake of clarity in illustration.

Figure 3:
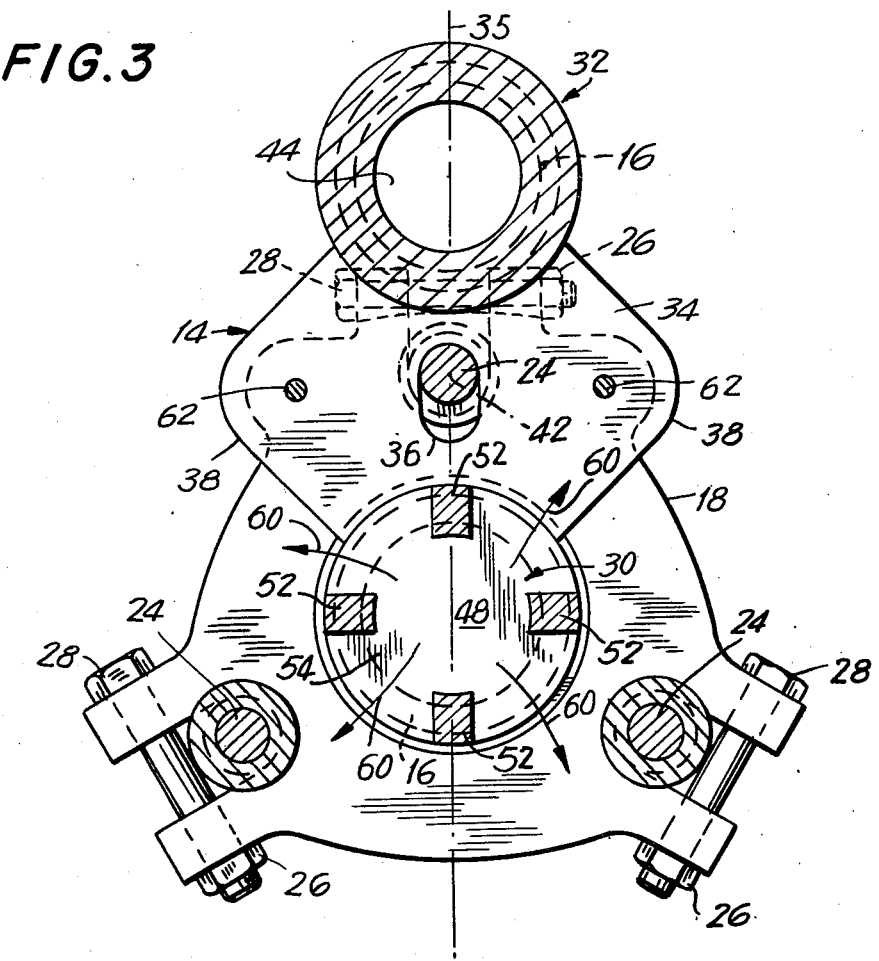
FIG. 3 is a view of the line blind taken along the line 3—3 of FIG. 2.

Operation of the spectacle line blind in accordance with this invention is now described. Assume, for the sake of example, that the spectacle plate 14 is in position with the disc 30 (FIGS. 2, 4) in the lower position with the solid disc 48 and O-rings 16 blocking the flow path 22 on the left side of the valve, and the opening 58 and spacing between the posts 52 allowing for venting from the passage 22 on the right side of the valve. The venting flow paths are indicated by the arrows 60 (FIGS. 2, 3). In order to open the blind, the body flanges 12 are spread apart by operation of the three spreader nut and bolt assemblies 24 in the known manner. Then, the spectacle plate 14 is rotated about the axis 42 until rotation brings the open circular disc 32 into the lower position. When the circular disc 32 with the opening 44 is aligned to the pipe stubs 20 and central opening 22, the O-ring seals on both sides of the disc 32 align to the stainless steel rings 46. Then, the body flanges are brought together by a reversed operation of the spreader nut and bolt assemblies 24 such that the flange plates 18 compress the O-rings 16 in the circular disc 32 and a tight connection is provided.

Positioning pins 62 are provided for insertion in holes in the web 34 on both sides of the rotational axis 42. These pins 62 engage holes in the flange plate 18 and assure proper alignment and positioning of the spectacle plate 14.

It will thus be seen that the objects set forth above, among those made apparent from the preceding description, are efficiently attained and, since certain changes may be made in the above construction without departing from the spirit and scope of the invention, is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language, might be said to fall therebetween.

What is claimed is:

1. A spectacle line blind including a pair of opposed spaced apart body flanges, said body flanges each having a flow opening and adapted for connecting to a pipe, and means for adjusting the spacing between said opposed body flanges, the improvement therein comprising:

a spectacle plate, said spectacle plate being movably mounted and positioned between said body flanges, a first portion of said plate, when said plate is in a first selected position, obstructing the opening in one said body flange and providing a flow path for receiving flow from said flow opening of the other said body flange, flow entering said first portion from said other body flange flow opening being discharged through lateral openings in said first portion, said first portion of said spectacle plate including a solid member and a member having an opening therethrough, and posts connected between said solid member and said member with said opening therethrough, said posts being spaced apart and providing said lateral openings therebetween, said solid member being positioned adjacent to said one body flange for blocking said flow opening therein, said member with said opening therethrough being positioned adjacent said other body flange for venting said flow opening therein, and a second portion of said plate having an opening therethrough, said plate opening being aligned to said flange openings when said plate is in a second selected position, a flow path being provided through said line blind from one said body flange to the other said body flange.

2. A spectacle line blind as claimed in claim 1, and further comprising support means for said spectacle plate, said spectacle plate moving between said first and second selected positions by pivoting about an axis on said support means.

3. A spectacle line blind as claimed in claim 2, wherein said first and second portions of said spectacle plate are positioned colinearly on opposite sides of said pivoting axis, said line of colinearity passing through said pivoting axis.

4. A spectacle line blind as claimed in claim 3, wherein said spectacle plate includes a web between said first and second portions.

5. A spectacle line blind as claimed in claim 4, and further comprising seals on said first and second portions of said spectacle plate, said seals being compressed against said body flanges when said space is reduced to hold said spectacle plate in one of said selected positions, a leak-tight blind with vent or a flow channel being selectively provided.

* * * * *